US009823640B2

(12) United States Patent
Crater et al.

(10) Patent No.: US 9,823,640 B2
(45) Date of Patent: Nov. 21, 2017

(54) NETWORKED PROGRAMMABLE INDUSTRIAL CONTROLLERS

(71) Applicants: Kenneth C. Crater, North Grafton, MA (US); Thomas N. Schermerhorn, Holliston, MA (US)

(72) Inventors: Kenneth C. Crater, North Grafton, MA (US); Thomas N. Schermerhorn, Holliston, MA (US)

(73) Assignee: CONTROL TECHNOLOGY CORPORATION, Hopkinton, MA (US)

(*) Notice: Subject to any disclaimer, the term of this patent is extended or adjusted under 35 U.S.C. 154(b) by 751 days.

(21) Appl. No.: 13/828,341

(22) Filed: Mar. 14, 2013

(65) Prior Publication Data
US 2014/0277592 A1 Sep. 18, 2014

(51) Int. Cl.
G05B 19/00 (2006.01)
G05B 19/05 (2006.01)

(52) U.S. Cl.
CPC .................. G05B 19/052 (2013.01)

(58) Field of Classification Search
CPC .................................. G05B 19/052
See application file for complete search history.

(56) References Cited

U.S. PATENT DOCUMENTS

| 5,313,386 A * | 5/1994 | Cook ............... G05B 9/03 700/82 |
| 5,805,442 A * | 9/1998 | Crater et al. ............... 700/9 |
| 6,201,996 B1 * | 3/2001 | Crater et al. ............... 700/9 |
| 6,615,258 B1 * | 9/2003 | Barry et al. ............... 709/223 |
| 8,260,579 B2 * | 9/2012 | Bickel ............... G01D 4/002 702/188 |
| 2002/0103569 A1 * | 8/2002 | Mazur ............ G05B 19/41805 700/216 |
| 2003/0005160 A1 * | 1/2003 | Schaefer ............... 709/248 |
| 2005/0085928 A1 * | 4/2005 | Shani ............... G05B 19/056 700/18 |
| 2005/0144437 A1 * | 6/2005 | Ransom ............... G06F 1/28 713/151 |
| 2007/0078658 A1 * | 4/2007 | Virji ............... G10L 15/26 704/275 |
| 2009/0070447 A1 * | 3/2009 | Jubinville ............... G06F 1/28 709/223 |

(Continued)

OTHER PUBLICATIONS

EtherCAT Technology Group, "Technical Introduction and Overview", https://www.ethercat.org/en/technology.html, accessed Sep. 8, 2015.

(Continued)

Primary Examiner — Christopher E Everett
(74) Attorney, Agent, or Firm — Morgan, Lewis & Bockius LLP

(57) ABSTRACT

Different devices or subsystems, including programmable industrial controllers, are connected to a common network. Each connected device has the capability for autonomous or quasi-autonomous action based on a common pool of information accessible on the network. For example, all or a subset of devices connected to the network may periodically broadcast status data over the shared network medium; status data may include the current state of the controller and/or environmental conditions that the controller monitors.

15 Claims, 3 Drawing Sheets

(56) References Cited

U.S. PATENT DOCUMENTS

| | | | | |
|---|---|---|---|---|
| 2010/0011356 A1* | 1/2010 | Nance | ................... | G06F 9/4416 |
| | | | | 718/1 |
| 2012/0041572 A1* | 2/2012 | Halsall | .............. | H04L 12/40032 |
| | | | | 700/19 |
| 2012/0265818 A1* | 10/2012 | Van Phan | ............... | H04W 4/06 |
| | | | | 709/204 |
| 2013/0051446 A1* | 2/2013 | Vijayasankar | ........... | H04B 3/54 |
| | | | | 375/224 |

OTHER PUBLICATIONS

Zheng, Yi, "An Introduction to QNX Transparent Distributed Processing", QNX Software Systems, Nov. 2011.

* cited by examiner

NETWORKED PROGRAMMABLE INDUSTRIAL CONTROLLERS

FIELD OF THE INVENTION

The present application relates to control of complex industrial equipment and processes, and more particularly to distributed systems of controllers that both monitor conditions and take actions based on sensed conditions.

BACKGROUND

Sophisticated industrial processes, such as oil refining, automobile assembly or power generation, require the cooperative execution of numerous interdependent tasks by many different pieces of equipment. The enormous complexity of ensuring proper task sequencing and management, which requires not only procedural logic but constant monitoring of equipment states to organize and distribute operations and detect malfunction, has resulted in the widespread adoption of programmable controllers. These controllers operate elaborate industrial equipment in accordance with a stored control program. When executed, the program causes the controller to examine the state of the controlled machinery by evaluating signals from one or more sensing devices (e.g., temperature or pressure sensors), and to operate the machinery (e.g., by energizing or de-energizing operative components) based on a procedural framework, the sensor signals and, if necessary, more complex processing. The "inputs" to a particular controller can extend beyond the sensed state of the equipment the controller directly operates to include, for example, its environment, the state of related machinery or the state of other controllers.

Ordinarily, process operation is monitored, at least intermittently, by supervisory personnel by means of one or more central management stations. Each station samples the status of controllers (and their associated sensors) selected by the operator and presents the data in some meaningful format. The management station may or may not be located on the same site as the monitored equipment; frequently, one central station has access to multiple sites (whether or not these perform related processes). To facilitate the necessary communication, the controllers and related computers (such as monitoring stations) are arranged as a computer network—i.e., a collection of interconnected nodes that use some consistent protocol to communicate with one another. Typically, the network is operated by a network server. Each controller stores its own state information and provides it to the server either periodically or in response to a server-originated query. Any number of monitoring stations may enter the network on an ad hoc basis, e.g., by wirelessly communicating with the server operating the network and requesting access; upon authentication, a newly connected monitoring station—which may be a portable device such as a "smart phone" or tablet—communicates with the server to obtain information regarding particular controllers. Similarly, if a particular controller requires state or environmental information from another controller (e.g., to confirm that an upstream valve is closed before initiating a process), it queries the server, which provides the most recently stored value.

A disadvantage posed by this usage convention is the concentration of all network and node information in a single device. With the advent of higher-speed networks, the proliferation of greater levels of computational power in subsystem components, and the ever-increasing need for more data-rich manufacturing systems, this centrist architecture becomes a source of vulnerability, with the server being subject to overburdening and single-point failure.

SUMMARY

In accordance with embodiments of the present invention, all or a subset of controllers connected to the network periodically broadcast status data over the shared network medium. Status data may include the current state of the controller and/or environmental conditions that the controller monitors. In some embodiments, each node maintains an internal database that includes status information for every controller currently connected to the network. When a new controller enters the network, each other controller detects its presence as it broadcasts status information and creates a database record for the new controller. When a controller leaves the network, that controller's information is removed from the other controllers' databases. The departure of a controller may be announced by the central server or may be detected by the other controllers; for example, if a controller has not broadcast information to the network for more than a threshold time, the other controllers may delete its record from their databases.

This approach avoids the need for individual controllers to query the central server for status information regarding other controllers. In addition, because status information is constantly being broadcast, a user interface device entering the network will accumulate, in a short time, a complete picture of the current status of all network-connected controllers without querying the central server—and that picture is constantly updated as new data is received over the network. Depending permission level, the user interface may be a passive device that only displays data or can be operable to change settings of any of the controllers and/or may be operable to alter programming of any of the controllers. In some implementations, the central server is omitted entirely and the intercommunicating controllers form an ad hoc network; new controllers enter the network by communicating in accordance with the appropriate protocols and with credentials recognized by the other controllers, or in accordance with a shared encryption scheme.

In various implementations, different devices or subsystems may be connected to the network, each having the capability for autonomous or quasi-autonomous action, based on the common pool of information accessible on the network. Since this information may include prospective data indicating the preprogrammed intent of other system components, the actions taken by these subsystems may include preparatory measures that are predictive of actions to be taken by other subsystems. In implementations employing procedural or state languages, each controller may periodically transmit not only its current state, but also a representation of the instructions controlling its possible future operations, thus allowing other controllers on the network to predict the possible future behavior of that controller.

Further, by promiscuous monitoring of all network traffic, any subsystem may have the capacity to maintain a complete image of the status of the entire process. Such a subsystem, if it is equipped with a provision for external access (via, for example, an intranet or the public Internet), may allow intensive remote monitoring or logging of the process status. Further, if a complete historical record is maintained of process status over a period of time, the behavior of the process and control system may be fully characterized, including fault conditions and operation under anomalous circumstances. The effect is a powerful, information-rich environment that facilitates adaptive distributed control, intensive analysis of system behaviors, and complete programmatic or human visibility into the functioning of the controlled process to any degree of granularity.

Accordingly, architectures in accordance herewith provide an information-rich stream of instruction and status packets which, collectively, can be used to fully observe, reconstruct and/or further control a process, machine or plant. A control program can be decentralized among independent but functionally interrelated controllers, and information characterizing the state of the network is omnipresent (at some level of temporal granularity). Advantages of this approach include, among others, straightforward implementation of distributed control; redundant control and soft-fail behaviors; the fact that data-rich human-machine interfaces (HMI), manufacturing execution systems, and data collection systems become easier to implement due to the ready availability of all relevant data; and because fine-grained status and instruction information is constantly available, detailed logging is possible with no additional network overhead, allowing tracebacks, fault analysis and other highly detailed examinations of system behavior.

In a first aspect, the invention relates to a programmable industrial controller configured for communication with other programmable industrial controllers over a computer network. In various embodiments, the controller comprises a network interface for communicating over the network; a database for storing (i) a specification of at least one control function, (ii) controller state information, and (iii) state information, received over the network via the network interface, of other controllers; a transmission module for periodically transmitting at least some of the controller state information over the network for broadcast to the other controllers; and an output interface for causing performance of the at least one control function. The state information may comprise one or more of (i) the status of the controller, (ii) the status of a device operated by the controller, or (iii) an environmental condition sensed by the controller. In some embodiments, the controller further comprises logic circuitry for selecting a control function for performance via the output interface, where the selection is based at least in part on the state of at least one other controller stored in the database.

The controller may include at least one sensor for sensing an external condition associated with a control function. In such cases, the transmission module may be configured to periodically transmit the sensed external condition over the network for broadcast to the other controllers, and the database may be configured to store external conditions sensed by other controllers and broadcast over the network. Logic circuitry may be included for selecting a control function for performance via the output interface, with the selection being based at least in part on an external condition reported by at least one other controller stored in the database. In various embodiments, the controller includes a memory partition for storing a control program comprising instructions for operating the network of controllers, and the transmission module is configured to transmit segments of the control program to the network for execution by selected ones of the controllers based at least in part on the controller state information.

In another aspect, the invention pertains to a system of linked programmable industrial controllers. In various embodiments, the system comprises a plurality of programmable industrial controllers intercommunicating over a computer network; each of the controllers comprises a network interface for communicating over the network; a database for storing (i) a specification of at least one control function, (ii) controller state information, and (iii) state information, received over the network via the network interface, of other controllers; a transmission module for periodically transmitting at least some of the controller state information over the network for broadcast to the other controllers; and an output interface for causing performance of the at least one control function. The network may further include at least one control node freely connectable to the network; the control node, when connected, receives data from the controllers connected to the network, and also includes (or is linked to) a display and a user interface for selectably displaying the data. The network may further include at least one history control node for receiving data from the controllers connected to the network and cumulatively storing the received data.

The network interface may be configured to receive commands directed toward one or more of the controllers and to broadcast the commands over the network. The databases of the controllers may be configured to store data most recently transmitted from the other controllers. In some embodiments, at least some of the controllers comprise logic circuitry for selecting a control function for performance via the output interface, where the selection is based at least in part on the state of at least one other controller stored in the database.

In yet another aspect, the invention pertains to a method of operating a linked network of programmable industrial controllers. In various embodiments, the method comprises the steps of periodically causing each of the controllers to broadcast status data over the network; connecting a device to the network; and continuously populating a database of the device with data received over the network, the populating step comprising (i) creating a database record for each of the controllers connected to the network, (ii) receiving state information from the connected controllers, (iii) storing the state information from each of the controllers in an associated record of the database, and (iv) updating the database as new data is received from the connected controllers. The method may also extend to detecting departure of a controller from the network and deleting the database record corresponding to the departed controller.

The connected device may be a user-interface device and/or another programmable industrial controller. The method may also include detecting, by the intercommunicating controllers, entry of the device onto the network; creating, at each of the intercommunicating controllers, a database entry for the device; receiving, at each of the intercommunicating controllers, state information from the device; and at each of the intercommunicating controllers, storing the state information from the device in the database entry created therefor.

In some embodiments, the network is an ad hoc network and the controllers communicate with each other directly over the network. A designated one of the controllers may store a control program comprising instructions for operating the network of controllers, with the designated controller transmitting segments of the control program to the network for execution by selected ones of the controllers based at least in part on the controller state information.

BRIEF DESCRIPTION OF THE DRAWINGS

Embodiments of the invention are better understood with reference to the following drawings. The elements of the drawings are not necessarily to scale relative to each other.

DETAILED DESCRIPTION

Figure 1:
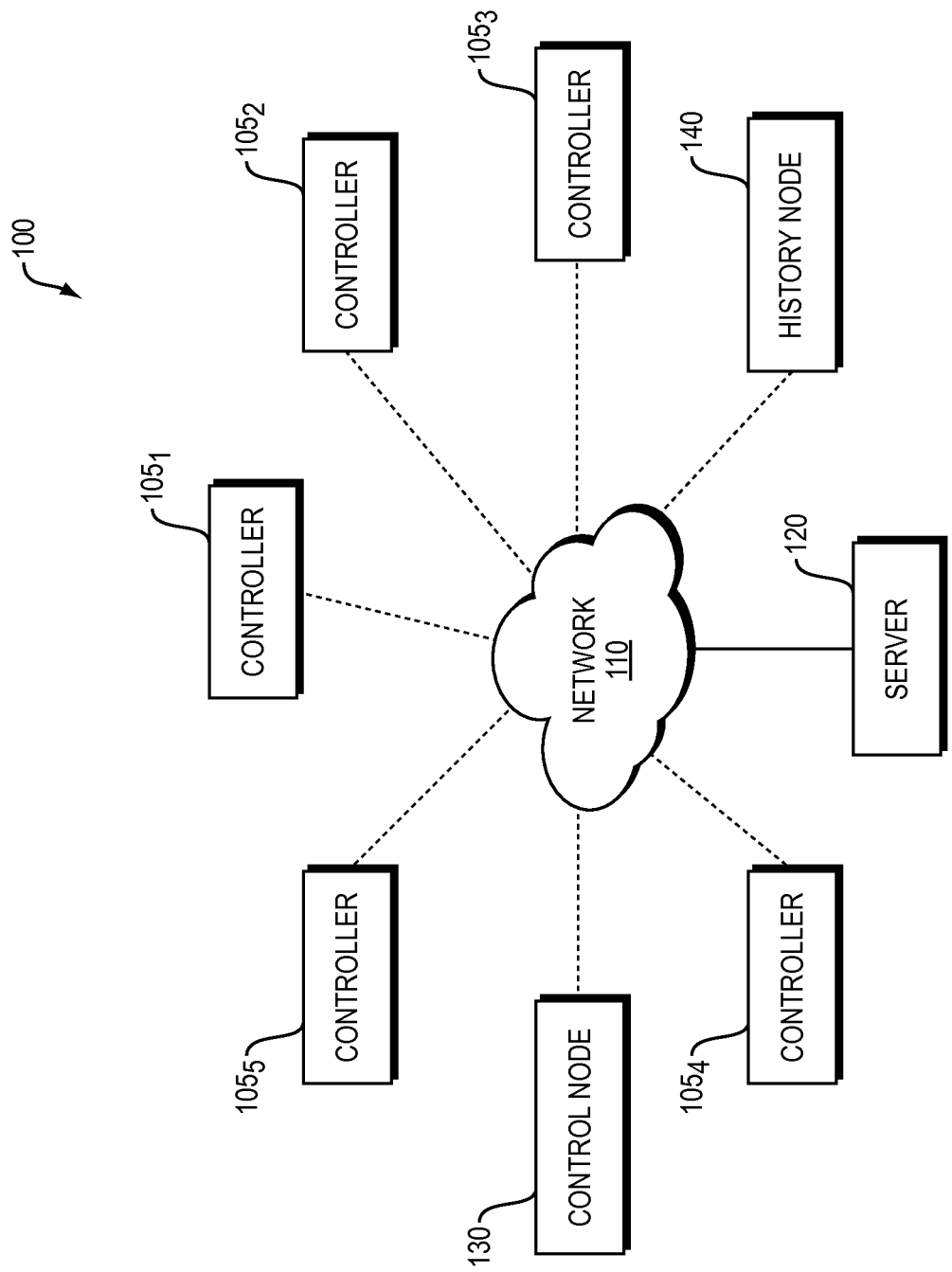
FIG. 1 schematically depicts a network of programmable industrial controllers in accordance with embodiments of the invention.

Refer first to FIG. 1, which illustrates the overall organization of a device network 100 in accordance with the invention. A plurality of programmable industrial controllers $105_1$, $105_2$, $105_3$, $105_4$ intercommunicate (e.g., wirelessly) as nodes of a network 110. If all controllers are within range of each other, they may send messages (which may be in the form of data packets) over a fixed frequency using a local area network (e.g., a ring topology) or other suitable network arrangement in which each device "multicasts" messages to all other devices in accordance with a communication protocol that allocates network time among the devices. An advanced routing protocol may be used to permit messages to reach all devices even though some are out of radio range of the message-originating device; each device "knows" which devices are within its range and propagates received messages to neighboring devices in accordance with the protocol. Numerous schemes for routing messages across, for example, mesh networks are known and may be employed herein; these include AODV, BATMAN, Babel, DNVR, DSDV, DSR, HWMP, TORA and the 802.11x standards. More generally, network 110 may be a wired or wireless local area network (LAN), a wide area network (WAN), an intranet, the Internet, the public telephone infrastructure, or some combination. It should be stressed that any of numerous modes of network communication can be utilized, e.g., direct peer-to-peer protocols, client-server architectures utilizing periodic polling of each subsystem rather than explicit message transmission, or token-passing schemes.

In some embodiments, the connection of controllers to the network 110 is managed by a supervisory network server 120. In other embodiments, network 110 operates autonomously as a shared communication protocol according to which each of the controllers 100 communicates with the others in an organized fashion that allows each device to send and receive messages to and from any other controller; in such arrangements, there is no central server mediating communications or connection.

Figure 2:
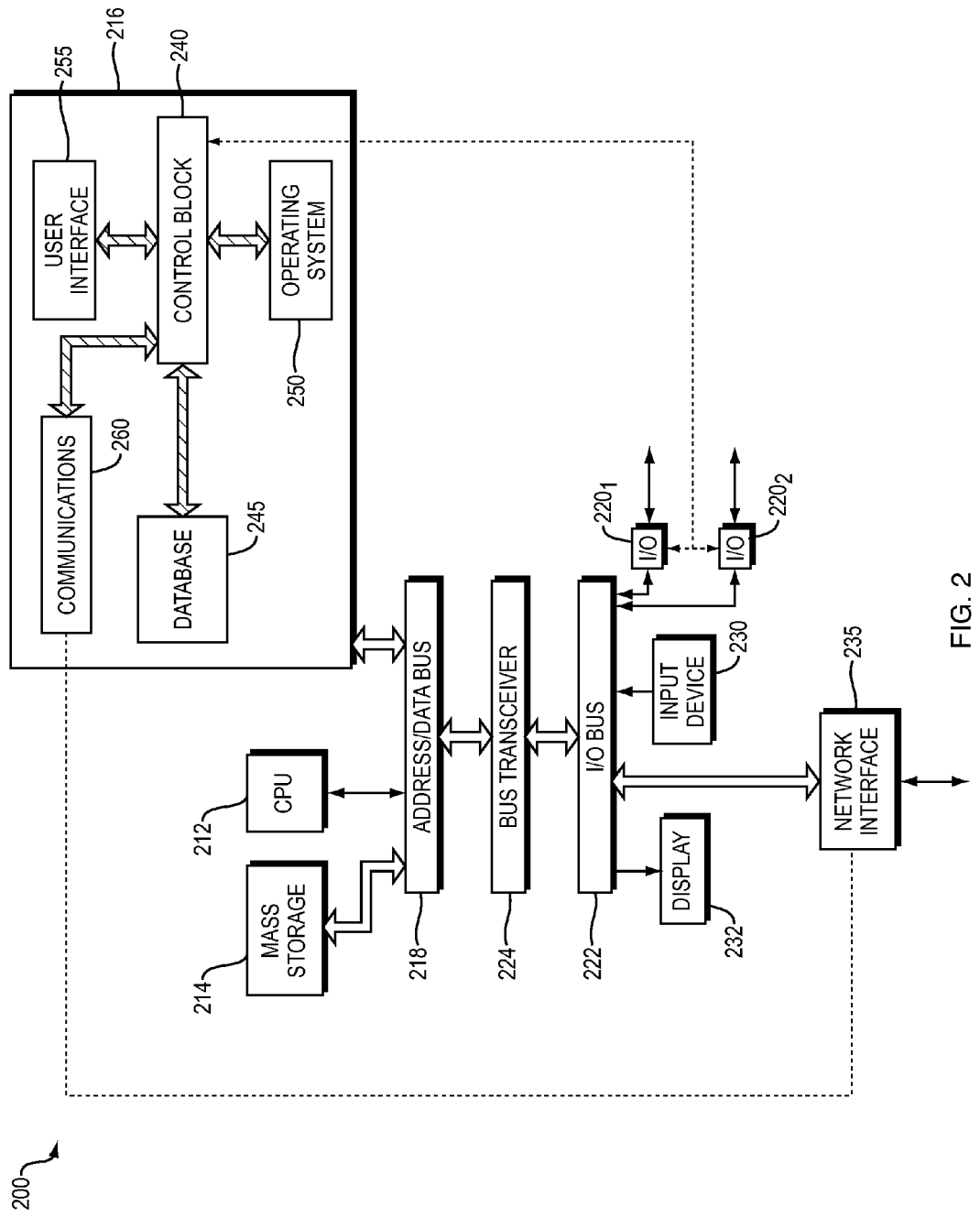
FIG. 2 illustrates the components of a representative controller device in accordance with embodiments of the invention.

The network 110 may also support one or more control nodes 130, which allow a user to obtain network information and, depending on the user's privilege level, to control devices connected to the network. One or more history nodes 140 may also be connected to network 110. These devices, and the more detailed operation of the network, are discussed below; the foregoing discussion is intended as context for the following description of a representative controller architecture in accordance with embodiments of the invention, as illustrated in FIG. 2. The illustrated controller 200 executes program instructions to operate, for example, a piece of industrial equipment. The controller 200 includes a central processing unit (CPU) (typically a microcomputer or microcontroller) 212 and one or more computer storage devices indicated generally at 214, 216. Ordinarily, storage device 214 provides nonvolatile mass storage, and may be, for example, an EEPROM or Flash memory; and storage 216 comprises a combination of volatile random-access memory (RAM) for temporary storage and processing, and non-volatile, programmable read-only memory (PROM) that contains permanent aspects of the system's operating instructions.

CPU 212 and computer storage 214, 216 communicate over an internal system bus 218. The controller 200 further includes a series of input/output (I/O) modules shown representatively at $220_1$, $220_2$ that sense the condition of, and send control signals to, the controlled machine over a machine interface. This machine interface, which may involve direct wiring or include a communication link for interaction over a computer network or telephone lines, facilitates the bidirectional exchange of signals between each I/O module and an associated device (e.g., a sensor or an actuator). I/O modules 220 connect to a secondary I/O bus 222, which is driven by a bus transceiver 224; in effect, buses 218, 222 and bus transceiver 224 form a single logical bus.

For simplicity, controller 200 is illustrated at a sufficient level of generality to encompass implementations combining both programming and control capabilities, as well as less elaborate controllers whose programming is generated on an external computer and loaded into the controller 200 (e.g., through insertion of a nonvolatile storage medium, over a computer network or serial line, over the Internet, etc.) Thus, the controller 200 also comprises one or more input devices 230, also connected to I/O bus 222, that permit the operator to program the controller and/or enter information. The output of either device can be used to designate information or to select particular areas of a screen display 232. In implementations providing complete programming capability, input devices 230 may include a keyboard and a position-sensing device such as a mouse. In implementations providing only control functions, a less extensive input/display system—such as an operator touch screen serving as both input and display device—may be preferred. A conventional network interface 235, which may be wired (e.g., ETHERNET) or wireless (e.g., 802.11x or cellular) or, in some embodiments, provide for both wired and wireless communications, also transmits and receives signals via I/O bus 222.

Storage 216 contains a series of functional blocks or modules that implement the functions performed by controller 200 through operation of CPU 212. A control block 240 contains computer-executable instructions for actually operating controlled equipment via I/O modules 220, and a database 245 for storing data gathered by controller 200 via I/O modules 220 as well as data received from other controllers. Control block 240 contains both the specific high-level instructions for operating the controller 200 and the compiler (or interpreter) module for translating these into instructions processed by CPU 212; its operative relationship to I/O modules 220 is indicated by the dashed line. Storage 216 may also include an operating system 250, which directs the execution of low-level, basic system functions such as memory allocation, file management and operation of storage device 214; and instructions defining a user interface 255, which facilitates straightforward interaction over screen display 232. User interface 255 may, for example, generate words or graphical images on display 232 to prompt action by the operator and accept operator commands from input device 230. A communications module 260 drives network interface 235 via I/O bus 222 to receive signals from outside devices and transmit signals to outside devices as described below.

Figure 3:
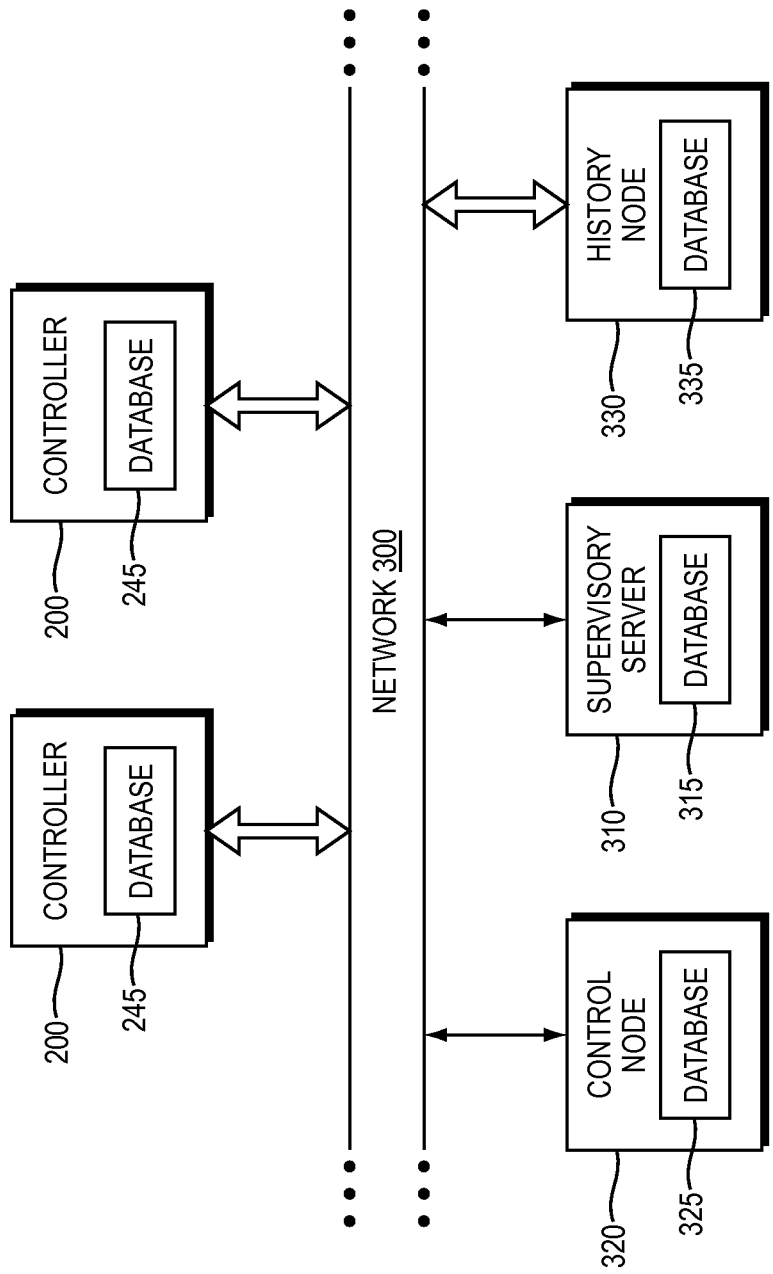
FIG. 3 shows a representative network organization in greater detail.

FIG. 3 illustrates a representative network implementation with greater specificity. As shown therein, a plurality of controllers 200 may intercommunicate via a wireless or wired network 300. If included, a supervisory server 310 may run authentication and registration application programs to facilitate addition of new controllers to the network 300. For example, a new controller may be installed mechanically at a plant site and its wireless network interface activated to establish wireless communication with server 310. Following execution of a "handshaking" protocol, server 310 may verify the compatibility and authorization of the new controller, obtain serial number and/or other identifying information (e.g., a MAC address) from the controller, and add a corresponding record in the database 315. Information obtained autonomously from the controller and/or from an operator installing the controller may determine the fields initialized as part of the new controller's record in database 315. Database 315 may be a memory partition or a separate memory device, and typically includes fields for information falling within at least the following categories: general information about a controller 200; controller state information, including the state of any controlled actuators or other devices operated by the controller; data regarding environmental conditions monitored by the controller or associated sensors; and device settings. Server 310 maintains this information for all controllers 200 currently connected to the network 300. As discussed in greater detail below, each controller 200 also maintains this information for every other controller.

Server 310 may be or include a general-purpose computing device in the form of a computer including a processing unit, a system memory, and a system bus that couples various system components including the system memory to the processing unit. As is well known, computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as ROM and RAM. A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system or platform.

Server 310 may also supervise the ad hoc entry of one or more control nodes 320, which are freely connectable to the network. Control node 320, when authenticated to server 310 and connected to network 300, receives data from the controllers 200 connected to the network. Control node 320 may be, for example, a wireless phone or tablet device capable of running an application that permits the user to communicate with server 310 and make selections, and presents data received via the network 300 on a display in an easily visualized manner; for example, the application may be a browser and the interface in the form of web pages served by the controllers; see, e.g., U.S. Pat. No. 5,805,442. Depending on the user's privilege level, server 310 may permit the control node 320 to query specific controllers, adjust operating parameters, disable improperly functioning controllers or override a current controller state.

A history node 330 may also be connected to the network 300. History node 330 is typically a computer with substantial on-board and/or remote but continuously available storage (denoted generically at 335) for accumulating state information over time from the various controllers 200 connected to the network. History node 330 may be queried directly by a control node 320 or via server 310, and in response to data requests returns database values associated with one or more controllers for a specified date or time range, facilitating troubleshooting and investigation of anomalies.

In typical operation, controllers 200 are constantly broadcasting device state information over network 300 in an indiscriminate multicast fashion—i.e., while adhering to a communication protocol that allocates the shared medium among the controllers, each device broadcasts state information that is received by all other controllers as well as server 310, any connected control nodes 320, and any connected history nodes 330. The nature of the transmitted data and its frequency of transmission may depend on the role played by a controller; while all controllers can be programmed simply to transmit all data at a uniform frequency, in some embodiments the controllers adjust both the data transmitted and how often transmission takes place based on internal programming and state. For example, each controller 200 may be provided with default transmission parameters that are varied depending on the deployment. Furthermore, the control block 240 (FIG. 2) of each controller 200 can reduce the rate of transmission if, for example, a state has not changed or based on a sensed rate of variation of a monitored parameter, such as temperature or pressure. Moreover, different data may be broadcast at different, dynamically adjustable rates, with more sensitive or rapidly varying data subject to more frequent transmission.

Each controller 200 accumulates in its database 245 data broadcast by all other controllers, typically maintaining only the most recently received value for each entry. The database 245 in each controller 200, in other words, is largely similar if not identical to the central database 315 of server 310; although server 310 may maintain some data history for ongoing analytical purposes, in some implementations historical data storage is the sole province of history node 330. When a new controller 200 enters network 300, each other controller creates a new database record for the entrant. When a controller exits the network 300 or malfunctions, that controller's information is removed from the other controllers' databases. The departure of a controller may be announced by server 310 or may be detected by the other controllers based on internal logic. For example, if a controller has not broadcast information to the network for more than a threshold time, the other controllers may delete its record from their databases; if the missing controller reappears, a new database entry is easily created.

Alternatively, each entry may be stored in a controller's database 245 along with a timestamp indicating the time of last update of that entry. Upon use of such data, the timestamp may be checked to determine if the associated data is sufficiently current for the intended purpose. In such a system, departure of another controller from the network need not cause the entries relating to that controller to be deleted; rather, the last entry received may be retained along with the timestamp indicating its age.

The constantly updated presence in each controller of network-wide state information permits a controller to execute instructions that depend on the status of other controllers without querying either the other controller(s) or server 310. It also permits controllers to take predictive action, in accordance with programming logic in control block 240, based on the internally known state of other controllers; and permits control node 320 to acquire a complete picture of the current network state, including the individual state of each controller 200, rapidly as control node 320 assimilates data from the network and populates its database 325. This complete picture is dynamic and constantly updated as new data is received.

Any suitable programming language may be used to implement without undue experimentation the functions of control block 240 as described above as well as the functions performed by server 310, control node 320 and history node 330. Illustratively, the programming language used may include assembly language, QUICKSTEP, Ada, APL, Basic, C, C++, C*, COBOL, dBase, Forth, FORTRAN, Java, Modula-2, Pascal, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In implementations employing procedural or state languages, it is further possible for each controller to periodically transmit not only its current state, but also a representation of the instructions controlling its possible future operations, thus allowing other controllers on the network to predict the possible future behavior of that controller.

An additional embodiment of the present invention employs a network of controllers as in FIG. 1, but where the control block 240 of only one of these controllers 105, designated the "Program Server," contains the high-level instructions for operating the entirety of the control system. In this embodiment, the high-level instructions may be in the form of a procedural or state language program, expressing the operation of the associated process as a sequence of events. The Program Server, in addition to any local control tasks it may perform, periodically broadcasts on the network segments of the program from its control block.

Each controller 105 on the network receives and stores program segments from the Program Server relating to its current and projected operation—projected, that is, by the Program Server. Some of the instructions contained within the program segments being executed by the various controllers may call for either linear progression through the program, or for jumps to discontinuous portions of the program, based on conditions being sensed by the controller. Each such controller periodically broadcasts, in addition to state information relating to the status of input and output devices connected to that controller, program execution information relating to the step or line number(s) of the program currently being executed by that controller.

The Program Server receives the program execution information being broadcast by all controllers, and uses that information to determine what additional program segments to broadcast, by analyzing the possible future program execution paths of the various controllers based on the programmed instructions being executed by the said controllers and the potential said instructions contain for forcing jumps to other program segments. Operation according to this embodiment conveys the additional advantage of storing the program for the entire control system in one place, facilitating convenient updating of the global program while the system is in operation.

This mode of operation may be useful in configurations where the proper operation of various controllers is dictated by conditions beyond the local environment of any one controller, e.g., if network-wide load-balancing or other global considerations are pertinent, or if the optimal procedure to be followed by a particular controller depends on the interplay of process conditions or controller states elsewhere; in both cases, distributed decisionmaking would be quite complex for any particular controller, as well as redundant and with an attendant risk of conflict. As an example of this mode of operation, a controller might be capable of executing different shut-down procedures for a controlled device—ranging from a gradual process with little risk to the device or the controller to an emergency shut-down with elevated risk to the device but potentially necessary to avoid damage to other devices or exposing personnel to dangerous conditions. Even if the controller possesses, in its database 245, a complete network picture including every other controller's state and monitored conditions, the programming required for selection of the optimal shut-down routine based on network-wide considerations may involve excessively complicated logic, and moreover, the shut-down routines themselves may need to change as new controllers (and their associated devices) enter the network. Lodging responsibility not only for global decisionmaking but also procedural control routines within a single network entity ensures that the proper balance between risk to a particular controller or device and wider risk across the network is struck, and that this decisionmaking can be responsive to evolving network configurations and design requirements without controller-by-controller reprogramming.

A further example of the use of a Program Server is in applications where a higher-level system, e.g., a computer containing make-to-order information, must be able to make changes to the operating program from time to time—based, in this case, on customer orders being received for the product under manufacture. In a distributed control system where the operating program is split among numerous controllers within the overall system, such modifications could present challenging technical issues in ensuring that changes to all such programs are enacted simultaneously or in a coordinated manner. The use of a single Program Server, however, simplifies these issues by allowing program changes to be enacted in one place, with the resultant program propagating to all controllers in the system as needed.

By the same principle, program changes required to optimize a system while the system is under operation may be more readily accomplished through the use of a single Program Server, with less risk of individual controllers operating with programs of differing revision levels with associated potential for malfunction.

It may be advantageous to maintain time synchronization among the various devices connected to network 300. This allows, for instance, each connected device to verify that information it has received is current and actionable. Additionally, if a device maintains an internal image of the state of the entire control system, the timestamp of an incoming record bearing new state information will help determine if it is newer than information previously stored in that internal image. To accomplish this timekeeping function, each network-connected device may maintain an internal clock synchronized to server 310, which is typically the principal timekeeper for the network. Server 310 may enforce synchronization by placing a timestamp on each command packet that it transmits on the network 300, and by ensuring that packets are transmitted with sufficient regularity to maintain system synchronization. This timekeeper role may, however, be delegated to one or more other connected devices. This may be desirable if, for example, one of the devices is equipped with specialized hardware for maintaining the time to a high degree of accuracy.

In some implementations, central server 310 is omitted and the intercommunicating controllers 200 form an ad hoc network where new controllers 200 enter the network 300 by communicating in accordance with a shared protocol and with credentials recognized by the other controllers. In a decentralized architecture, each of the controllers 200 may participate in routing of messages, particularly if a destination node is out of wireless range of a transmitting node. The communication protocol may involve encryption in accordance with a key provided only to authorized devices, so that even if an unauthorized device detects the network 300 and attempts to communicate thereon, the authorized devices will effectively ignore it.

While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A programmable industrial controller configured for communication with other programmable industrial controllers over a computer network, the controller comprising:
   a network interface for communicating over the network;
   a database for storing (i) a specification of at least one control function, (ii) controller state information, and (iii) state information, received over the network via the network interface, of other controllers;
   a transmission module for periodically transmitting at least some of the controller state information over the network for broadcast to the other controllers;
   an output interface for causing performance of the at least one control function; and
   a memory partition for storing a control program comprising instructions for operating the network of controllers, the transmission module being configured to transmit segments of the control program to the network for execution by selected ones of the controllers based at least in part on the controller state information.

2. The controller of claim 1, wherein the state information comprises at least one of (i) a status of the controller, (ii) a status of a device operated by the controller, or (iii) an environmental condition sensed by the controller.

3. The controller of claim 1, further comprising logic circuitry for selecting a control function for performance via the output interface, the selection being based at least in part on the state of at least one other controller stored in the database.

4. The controller of claim 1, further comprising at least one sensor for sensing an external condition associated with a control function, wherein (i) the transmission module is configured to periodically transmit the sensed external condition over the network for broadcast to the other controllers and (ii) the database is configured to store external conditions sensed by other controllers and broadcast over the network.

5. The controller of claim 4, further comprising logic circuitry for selecting a control function for performance via the output interface, the selection being based at least in part on an external condition reported by at least one other controller stored in the database.

6. A system of linked programmable industrial controllers, the system comprising a plurality of programmable industrial controllers intercommunicating over a computer network, each of the controllers comprising a network interface for communicating over the network; a database for storing (i) a specification of at least one control function, (ii) controller state information, and (iii) state information, received over the network via the network interface, of other controllers; a transmission module for periodically transmitting at least some of the controller state information over the network for broadcast to the other controllers; an output interface for causing performance of the at least one control function; and a memory partition for storing a control program comprising instructions for operating the network of controllers, the transmission module being configured to transmit segments of the control program to the network for execution by selected ones of the controllers based at least in part on the controller state information.

7. The network of claim 6, further comprising at least one control node freely connectable to the network, the control node, when connected, receiving data from the controllers connected to the network, the control node comprising a display and a user interface for selectably displaying the data.

8. The network of claim 6, further comprising at least one history control node for receiving data from the controllers connected to the network and cumulatively storing the received data.

9. The network of claim 6, wherein the network interface is configured to receive commands directed toward one or more of the controllers and to broadcast the commands over the network.

10. The network of claim 6, wherein the databases of the controllers are configured to store data most recently transmitted from the other controllers, and further comprising a history node for storing cumulative data broadcast over the network.

11. The network of claim 6, wherein at least some of the controllers comprise logic circuitry for selecting a control function for performance via the output interface, the selection being based at least in part on the state of at least one other controller stored in the database.

12. A method of operating a linked network of programmable industrial controllers, the network comprising a plurality of programmable industrial controllers intercommunicating over the network, the method comprising the steps of:
   periodically causing each of the controllers to broadcast status data over the network;
   connecting a new controller to the network; and
   continuously populating a database of the new controller with data received over the network from the other controllers, the populating step comprising (i) creating a database record for each of the controllers connected to the network, (ii) receiving state information from the other connected controllers, (iii) storing the state information from each of the controllers in an associated record of the database, and (iv) updating the database as new data is received from the other connected controllers, wherein a designated one of the controllers stores a control program comprising instructions for operating the network of controllers, the designated controller transmitting segments of the control program to the network for execution by selected ones of the controllers based at least in part on the controller state information.

13. The method of claim 12, further comprising the steps of:

detecting departure of a controller from the network; and
deleting the database record corresponding to the departed controller.

14. The method of claim 12, further comprising the steps of:

detecting, by the intercommunicating controllers, entry of the new controller onto the network;
creating, at each of the intercommunicating controllers, a database entry for the new controller;
receiving, at each of the intercommunicating controllers, state information from the new controller; and
at each of the intercommunicating controllers, storing the state information from the new controller in the database entry created therefor.

15. The method of claim 12, wherein the network is an ad hoc network and the controllers communicate with each other directly over the network.

\* \* \* \* \*